United States Patent Office 3,010,902
Patented Nov. 28, 1961

3,010,902
ORGANIC SULFUR-MOLYBDENUM BLUE COMPOSITION AND A LUBRICATING OIL CONTAINING SAME
Günter Spengler, Hannsheinz Hohn, and Josef Gänsheimer, Munich, Germany, assignors to The Alpha Molykote Corporation, Stamford, Conn.
No Drawing. Filed July 11, 1956, Ser. No. 597,094
15 Claims. (Cl. 252—46.4)

This invention relates to a lubricant additive, to a lubricant containing such additive and to a method of preparing the same.

It is the primary purpose of the present invention to improve the lubrication characteristics of lubricants by providing additives therefor which are thermally stable, organic molybdenum blue compounds, preferably but not necessarily containing sulfur.

In accordance with the preferred embodiment of the invention, an organic sulfur-molybdenum blue is prepared by interaction of an unsaturated alcohol or organic base, sulfur and molybdenum blue. If thermal stability of this compound, i.e., resistance to decomposition at temperatures of about 95° C. or higher, is desired, such stability can be obtained by the addition of an oil-soluble higher fatty acid such as oleic acid or the reaction product thereof with an organic base. The organic sulfur-moybdenum blue compounds that are prepared with an organic base may, for example, be stabilized with oleic acid as such since the known corrosive action of oleic acid is neutralized by the organic base. However, to avoid corrosion of metal parts, the organic sulfur-molybdenum blue compounds not prepared with organic bases, i.e., with an alcohol, are preferably made thermally stable by the addition of the reaction product of an oil-soluble higher fatty acid with an organic base rather than by the addition of the acid per se.

In accordance with another embodiment of the invention, organic molybdenum blue compounds are prepared by reacting molybdenum blue with an organic base or an unsaturated alcohol. The organic molybdenum blue compounds thus obtained can be made thermally stable in the same way as the organic sulfur-molybdenum blue compounds and are useful with lubricants containing sulfur or an organic sulfur compound.

Molybdenum blue is a mixed oxide believed to have the formula $MoO_2 \cdot 4MoO_3 \cdot 6H_2O$. It may be prepared in any one of a number of different ways known in the art. In the method of the invention, the molybdenum blue is preferably used in the form of a solution in isobutyl alcohol.

The unsaturated alcohols and organic bases that are suitable for reaction with sulfur and with molybdenum blue in accordance with the preferred embodiment of the invention generally include those having hydrocarbon radicals containing between about 8 and about 20 carbon atoms, preferably between about 14 to 18 carbon atoms. Among those that have been found particularly useful are such alcohols as tetradecanol, hexadecanol and octadecenol, and organic bases such as dehydroabietylamine, oleylamine and reaction products of higher fatty acids with amino alcohols such as 1-hydroxyethyl-2-heptadecenyl glyoxalidine

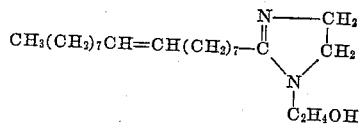

available under the tradename "Amine 220."
These bases and alcohols, and other organic bases including, e.g., octylamine, 1-hydroxyethyl-2-heptadecyl glyoxalidine

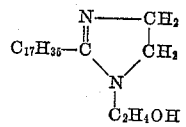

and the reaction products of ethylene oxide with an amine such as octadecyl amine, e.g.,

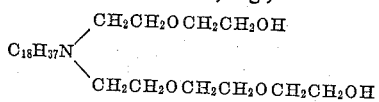

are suitable for reaction with molybdenum blue in the preparation of organic molybdenum blues that do not contain sulfur but are useful as lubricant additives in conjunction with sulfur and organic sulfur compounds. Optimum effects have been obtained with the use of "Amine 220" as the organic reactant in the method of the invention.

In preparing an organic sulfur-molybdenum blue compound in accordance with the preferred embodiment of the invention, an unsaturated alcohol or amine is reacted with sulfur and then with molybdenum blue to form the corresponding alcohol-sulfur-molybdenum blue or amine-sulfur-molybdenum blue compound. Optimum effects are obtained by reacting approximately equimolar proportions of sulfur and organic compound at an elevated temperature below the boiling point or temperature of decomposition of the organic compound, but sufficiently high to effect dissolution of the sulfur, and thereafter reacting with molybdenum blue a molar excess, preferably of the order of about 14:1, of the organic sulfur compound so obtained.

The proportion by weight of the organic-sulfur-molybdenum blue additives in a lubricating oil and of unsulfurized organic-molybdenum blue additives in a lubricating oil containing sulfur or in a lubricating oil to which an oil-soluble sulfur compound such as benzyl sulfide or dibenzyl sulfide is added previously, simultaneously or subsequently, may vary widely depending upon the results desired. Generally, concentrations of 0.5 to about 5% by weight and preferably 2 to 5% by weight have the very desirable effect of increasing the Four Ball E.P. test rating by 300 to 400 kg. and most significantly improve the values obtainable on the Almen-Wieland Testing Machine.

Certain of the organic-sulfur-molybdenum blue additives such as those obtained by reaction of sulfurized "Amine 220" with molybdenum blue are not entirely soluble in oil. This can readily be remedied by the use of a solubilizer such as a saturated or unsaturated alcohol having 8 to 20, and preferably 10 to 18, carbon atoms. Decanol, decenol, dodecanol, dodecenol, hexadecanol and hexadecenol, as well as mixtures of these and other alcohols containing 8 to 20 carbon atoms, are particularly desirable for this purpose.

The advantages and utility of the products and the method of the invention will become further apparent from the following examples illustrating the best modes now contemplated for carrying out the invention.

*Example 1*

100 ml. of pure concentrated sulfuric acid are heated until a white fog is formed. Six grams of pure, pulverized $MoO_3$ are then added thereto, followed by boiling for five to ten minutes until the $MoO_3$ is dissolved. After cooling, the product is poured into 100 ml. of distilled water. 0.3 gram of pure, pulverized metallic molybdenum are then added as reducing agent and the solution is boiled from three to five minutes. After setting aside for ten to twenty minutes, the resulting blue liquid is decanted from the remaining metallic molybdenum. To 200 ml. of the solution thus obtained, there are added 200 ml. of isobutyl alcohol and 600 ml. of distilled water. After separation into two layers, the isobutyl alcohol layer containing the molybdenum blue is shaken several times with distilled water until the isobutyl alcohol solution has a pH of about 4 to 5. The isobutyl alcohol solution is then dried over anhydrous sodium sulfate and filtered off.

1.6 grams of sulfur were dissolved in 17.5 grams of "Amine 220" and heated to 130–150° C. until a brown, pasty mass was obtained. 9.6 grams of the "Amine 220"–S reaction product were dissolved in the molybdenum blue-isobutyl alcohol solution prepared as described. A mixture of 2.7 grams of the amine-sulfur-molybdenum blue compound that remained after distillation and 2.3 grams of a mixture of alcohols having chain lengths of 14 to 18 carbon atoms were dissolved in 100 grams mineral lubricating oil which was then tested on the Four Ball tester and on the Almen-Wieland machine. The results, and those obtained for the purpose of comparison with the same base mineral oil untreated, were:

|  | Loading on Four Ball Tester, kg. | Loading Capacity on Almen-Wieland Machine, kg. |
|---|---|---|
| Base Oil | 130/140 | 300 |
| Treated Oil | 300/320 | 1,500 |

This data indicates that the organic molybdenum blue compound containing sulfur in the molecule is most effective in imparting E.P. characteristics to a lubricating oil.

A sample of the treated oil was kept for twelve hours at a temperature of 95° C. in a drying cabinet. When the heat-stored oil, which was observed to have a black flocculant precipitate, was tested on the Four Ball tester and the Almen-Wieland machine, it was found that the values obtainable thereon were 130/140 kg. and 300 kg., respectively.

1.5 grams of oleic acid were added to one 100-gram sample of the treated lubricating oil and 3 grams of the reaction product of oleic acid with "Amine 220" were added to another sample. These samples were then stored for thirty-six hours at 95° C. in the drying cabinet and, after standing, tested on the Four Ball tester and the Almen-Wieland machine. It was found that the values of both samples on both testers were 300/320 kg. and 1500 kg., respectively.

These tests show that the organic molybdenum blue-sulfur compounds of the invention are not entirely stable at elevated temperatures but that they may be made stable by addition thereto of oleic acid or a reaction product thereof with an organic amine base.

*Example 2*

To individual samples of molybdenum blue solution in isobutyl alcohol, each prepared from six grams MoO$_3$ as described in Example 1, there were added:

| A | 6.0 grams hexadecenol. |
|---|---|
| B | 6.5 grams dehydroabietylamine. |
| C | 3.25 grams oleylamine. |
| D | 8.0 grams "Amine 220." |

The isobutyl alcohol was in each instance distilled off on a water bath at a pressure of about 12 mm. Hg and the residue was heated for one hour at 95° C. One gram of each of the organic molybdenum blues thus obtained and one gram of dibenzyl disulfide were then dissolved in 100-gram samples of base mineral oil. The doped samples of oil were then tested on a Four Ball tester and on an Almen-Wieland machine and compared with the same mineral oil (*a*) undoped, and (*b*) sulfurized to a sulfur content of 1% to which one gram of oleylaminemolybdenum blue had been added. The results of the various tests are tabulated immediately below:

| Oil | Value on the Four Ball Apparatus in kg. | Almen-Wieland Loading Capacity in kg. |
|---|---|---|
| Base Oil—Undoped | 130/140 | 300 |
| Base Oil+2% Dibenzyl Disulfide | 180/190 | 350 |
| Base Oil+1% Hexadecenol-Molybdenum Blue | 130/140 | 300 |
| Base Oil+1% Hexadecenol-Molybdenum Blue and 1% Dibenzyl Disulfide | 460/480 | 350 |
| Base Oil+1% Dehydroabietylamine-Molybdenum Blue | 130/140 | 300 |
| Base Oil+1% Dehydroabietylamine-Molybdenum Blue and 1% Dibenzyl Disulfide | 480/500 | 350 |
| Base Oil+1% Oleylamine-Molybdenum Blue | 130/140 | 350 |
| Base Oil+1% Oleylamine-Molybdenum Blue and 1% Dibenzyl Disulfide | 480/500 | 400 |
| Base Oil+1% "Amine 220"-Molybdenum Blue | 130/140 | 350 |
| Base Oil+1% "Amine 220"-Molybdenum Blue and 1% Dibenzyl Disulfide | 460/480 | 400 |
| Sulfurized Base Oil containing 1% Sulfur and 1% Oleylamine-Molybdenum Blue | 460/480 | 350 |

The data in the foregoing table shows that desirable synergistic effects are obtained by the addition of an organic molybdenum blue compound and an active sulfur-containing compound such as dibenzyl disulfide to an oil and by the addition of an organic molybdenum blue compound to a sulfurized oil. The values obtained on the Four Ball tester in accordance with the invention are increased by 300 to 400 kg. while the values obtained on the Almen-Wieland machine are also improved. These improvements are demonstrated, by the results obtained with dibenzyl disulfide alone and with organic molybdenum blues alone, to be derived from the combination of the invention and not to be attributable solely to sulfur content.

It is believed that at the relatively high local pressures and temperatures that occur at the places of actual lubrication, i.e., at the bearing surfaces, the organic molybdenum blue component reacts with the sulfur in sulfurized oil or sulfur-containing compound to form a compound of molybdenum and sulfur, possibly molybdenum disulfide, in situ, and that it is the formation of such a compound on the bearing surfaces that is responsible for the excellent lubrication that is obtained.

It is to be understood that many modifications will readily become apparent to those skilled in the art upon reading this description. All such modifications are intended to be included within the scope of the invention as defined in the appended claims.

We claim:

1. An organic sulfur-molybdenum blue composition consisting essentially of the product obtained by reacting approximately equimolar amounts of sulfur and an organic compound selected from the group consisting of unsaturated alcohols and organic bases having hydrocarbon radicals containing between about 8 and 20 carbon atoms at an elevated temperature below the boiling and decomposition temperatures of said organic compound and then reacting a molar excess of the resulting compound with molybdenum blue.

2. A lubricating oil containing between about 0.5 and 5% by weight of the composition defined in claim 1.

3. An organic sulfur-molybdenum blue composition consisting essentially of the product obtained by reacting approximately equimolar amounts of sulfur and an organic base having a hydrocarbon radical containing between about 14 and 18 carbon atoms at an elevated temperature below the boiling and decomposition temperatures of said organic base and then reacting a molar excess of the resulting compound with molybdenum blue.

4. An organic sulfur-molybdenum blue composition consisting essentially of the product obtained by reacting approximately equimolar amounts of sulfur and of 1-hydroxyethyl-2-heptadecenyl glyoxalidine at an elevated temperature below the boiling and decomposition temperatures of said glyoxalidine and then reacting a molar excess of the resulting compound with molybdenum blue.

5. A lubricating oil containing between about 2 and 3% by weight of the composition defined in claim 4, between about 2 and 3% by weight of a mixture of oil-solubilizing alcohols having 14 to 18 carbon atoms, and between about 1 and 2% by weight of oleic acid.

6. A lubricating oil containing between about 2 and 3% by weight of the composition defined in claim 4, between about 2 and 3% by weight of a mixture of oil-solubilizing alcohols having 14 to 18 carbon atoms and oleic acid, and between about 2.5 and 3.5% by weight of a reaction product of oleic acid with 1-hydroxyethyl-2-heptadecenyl glyoxalidine.

7. An organic sulfur-molybdenum blue composition consisting essentially of the product obtained by dissolving elemental sulfur in an approximately equimolar amount of an organic compound of the group consisting of unsaturated alcohols and organic bases having hydrocarbon radicals containing between about eight to twenty carbon atoms at an elevated temperature below the boiling and decomposition temperatures of said organic compound and then dissolving a molar excess of the sulfurized organic compound thus obtained in a solution of molybdenum blue.

8. A lubricating oil containing between about 0.5 and 5% by weight of the composition defined in claim 7.

9. A composition of matter consisting essentially of the product obtained by reacting approximately equimolar amounts of sulfur and of an organic compound selected from the group consisting of unsaturated alcohols and organic bases having hydrocarbon radicals containing between about 8 and 20 carbon atoms at an elevated temperature below the boiling and decomposition temperatures of said organic compound and then reacting a molar excess of the resulting compound with molybdenum blue in admixture with a thermal stabilizer therefor selected from the group consisting of oil-soluble higher fatty acids and the reaction products thereof with organic bases.

10. A composition of matter consisting essentially of the product obtained by reacting approximately equimolar amounts of sulfur and of 1-hydroxyethyl-2-heptadecenyl glyoxalidine at an elevated temperature below the boiling and decomposition temperatures of said glyoxalidine and then reacting a molar excess of the resulting compound with molybdenum blue in admixture with a mixture of oil-solubilizing alcohols having 14 to 18 carbon atoms and oleic acid.

11. A sulfurized lubricating oil containing between about 0.5 and 5% by weight of an organic molybdenum blue prepared by reacting molybdenum blue with a molar excess of an organic base having a hydrocarbon radical containing between about 8 and 20 carbon atoms at an elevated temperature below the boiling and decomposition temperatures of said organic base.

12. A lubricating oil containing between about 0.5 and 5% by weight of an organic molybdenum blue prepared by reacting molybdenum blue with a molar excess of an organic base having a hydrocarbon radical containing between about 8 and 20 carbon atoms and between about 0.5 and 3% by weight of an oil-soluble organic sulfur compound of the group consisting of benzyl sulfide and dibenzyl sulfide at an elevated temperature below the boiling and decomposition temperatures of said organic base.

13. A lubricating oil containing between about 0.5 and 5% by weight of an organic molybdenum blue prepared by reacting molybdenum blue with a molar excess of an organic base having a hydrocarbon radical containing between about 8 and 20 carbon atoms, between about 0.5 and 3% by weight of an alcohol containing between about 10 and 18 carbon atoms, and between about 0.5 and 3% by weight of an oil-soluble organic sulfur compound of the group consisting of benzyl sulfide and dibenzyl sulfide at an elevated temperature below the boiling and decomposition temperatures of said organic base.

14. A lubricating oil containing between about 0.5 and 5% by weight of an organic molybdenum blue prepared by reacting molybdenum blue with a molar excess of an unsaturated alcohol containing between about 8 and 18 carbon atoms and between about 0.5 and 3% by weight of an oil-soluble organic sulfur compound of the group consisting of benzyl sulfide and dibenzyl sulfide.

15. A method which comprises reacting approximately equimolar amounts of sulfur and of an organic compound selected from the group consisting of unsaturated alcohols and organic bases having hydrocarbon radicals containing between about 8 and 20 carbon atoms at an elevated temperature below the boiling and decomposition temperatures of said organic compound and then reacting a molar excess of the resulting compound with molybdenum blue.

References Cited in the file of this patent

UNITED STATES PATENTS

| Number | Name | Date |
|---|---|---|
| 2,150,349 | Van Peski et al. | Mar. 14, 1939 |
| 2,334,566 | Lincoln | Nov. 16, 1943 |
| 2,340,247 | Lincoln et al. | Jan. 25, 1944 |
| 2,542,982 | Bartleson | Feb. 27, 1951 |
| 2,556,108 | Ruedrich | June 5, 1951 |
| 2,562,904 | Freeman | Aug. 7, 1951 |